United States Patent
Slavin (10) Patent No.: US 12,282,917 B2
(45) Date of Patent: *Apr. 22, 2025

(54) SYSTEM AND METHOD FOR IMPLEMENTING A MARKET DATA HUB VIA DISTRIBUTED LEDGER TECHNOLOGY

(71) Applicant: JPMorgan Chase Bank, N.A., New York, NY (US)

(72) Inventor: Ilya Slavin, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 16/845,156

(22) Filed: Apr. 10, 2020

(65) Prior Publication Data

US 2020/0327544 A1   Oct. 15, 2020

Related U.S. Application Data

(60) Provisional application No. 62/833,019, filed on Apr. 12, 2019.

(51) Int. Cl.
*G06Q 20/40* (2012.01)

(52) U.S. Cl.
CPC .................................. *G06Q 20/40* (2013.01)

(58) Field of Classification Search
None
See application file for complete search history.

(56) References Cited

U.S. PATENT DOCUMENTS

| 6,938,021 | B2* | 8/2005 | Shear | G06Q 30/00 705/67 |
|---|---|---|---|---|
| 10,817,853 | B1* | 10/2020 | Brock | G06Q 20/02 |
| 11,005,839 | B1* | 5/2021 | Shahidzadeh | H04W 12/06 |
| 11,514,448 | B1* | 11/2022 | Liberman | G06Q 20/3829 |
| 2006/0259433 | A1* | 11/2006 | Lahtinen | H04N 21/63345 348/E7.056 |
| 2010/0179862 | A1* | 7/2010 | Chassin | G06Q 30/0282 705/347 |
| 2014/0337441 | A1 | 11/2014 | Schnitman et al. | |
| 2017/0206603 | A1 | 7/2017 | Al-Masoud | |

(Continued)

FOREIGN PATENT DOCUMENTS

WO    WO 2019/054044 A1    7/2018

OTHER PUBLICATIONS

Search Report issued in European Patent Application No. 20 16 9439.5 mailed Jul. 16, 2020, pp. 9.

(Continued)

*Primary Examiner* — Chrystina E Zelaskiewicz
(74) *Attorney, Agent, or Firm* — Greenblum & Bernstein, P.L.C.

(57) ABSTRACT

An embodiment of the present invention is directed to a Market Data Hub with Distributed Ledger Technology. The innovative system and method are directed to implementing a Quorum Blockchain Node that manages contributed content and allows for custom analytics, alerting, reporting, machine learning interfaces, etc., while preserving entitlements controls and privacy controls specific to participants. Moreover, the system and method disseminates market data to downstream consumers and syndicated entities that are entitled to view the market data.

18 Claims, 3 Drawing Sheets

(56) References Cited

U.S. PATENT DOCUMENTS

| | | | | |
|---|---|---|---|---|
| 2017/0270598 | A1* | 9/2017 | Ram | G06Q 30/0641 |
| 2017/0331910 | A1* | 11/2017 | Lada | G06Q 10/101 |
| 2018/0285839 | A1 | 10/2018 | Yang et al. | |
| 2018/0307859 | A1* | 10/2018 | LaFever | H04L 63/20 |
| 2018/0350451 | A1* | 12/2018 | Ohnemus | H04L 67/535 |
| 2019/0026730 | A1 | 1/2019 | Moy et al. | |
| 2019/0254013 | A1* | 8/2019 | Chang | H04L 5/00 |
| 2019/0370866 | A1* | 12/2019 | Lawbaugh | G06Q 30/0254 |
| 2020/0013118 | A1* | 1/2020 | Treat | G06Q 20/383 |
| 2020/0014745 | A1* | 1/2020 | Thurimella | H04L 63/0428 |
| 2020/0211111 | A1* | 7/2020 | Co | G06Q 20/3678 |
| 2020/0213316 | A1 | 7/2020 | Takahashi et al. | |

OTHER PUBLICATIONS

Thomas Espel et al., "Proposal for Protocol on a Quorum Blockchain with Zero Knowledge", IACR, International Association for Cryptologic Research, vol. 20171110:173714, Nov. 10, 2017 (Nov. 10, 2017), pp. 1-22, XP061034761, Retrieved from the Internet: URL:http://eprint.iacr.org/2017/1093.pdf [retrieved on Nov. 10, 2017] * the whole document*.

Leo Brousmiche Kei et al., "Hybrid Cryptographic Protocol for Secure Vehicle Data Sharing Over a Consortium Blockchain", 2018 IEEE International Conference on Internet of Things (ITHINGS) and IEEE Green Computing and Communications (GREENCOM) and IEEE Cyber, Physical and Social Computing (CPSCOM) and IEEE Smart Data (Smartdata), IEEE, Jul. 30, 2018 (Jul. 30, 2018), pp. 1281-1286, XP033556303, DOI: 10.1109/CYBERMATICS 2018. 2018.00223, [retrieved on May 30, 2019].

Japanese Office Action from the Japanese Patent Office (JPO) in Japanese Pat. Appl. No. 2020-071302, dated Feb. 5, 2024.

Japanese Notice of Allowance from the Japanese Patent Office (JPO), in Japanese Pat. Appl. No. 2020-071302, dated Sep. 13, 2024.

European Examination Report from the European Patent Office (EPO), in European Pat. Appl. No. 20169439.5, dated Jan. 10, 2025.

* cited by examiner

SYSTEM AND METHOD FOR IMPLEMENTING A MARKET DATA HUB VIA DISTRIBUTED LEDGER TECHNOLOGY

CROSS REFERENCE TO RELATED APPLICATIONS

The application claims priority to U.S. Provisional Application 62/833,019, filed Apr. 12, 2019, the contents of which are incorporated herein in its entirety. The application is related to PCT/US19/27185, filed Apr. 12, 2019, which claims priority to U.S. Provisional Application 62/656,585, filed Apr. 12, 2018, the contents of which are incorporated herein in their entirety.

FIELD OF THE INVENTION

The invention relates generally to a system and method for implementing a multi-dealer market data distribution system via distributed ledger technology, such as a Quorum implementation of Blockchain.

BACKGROUND OF THE INVENTION

Large financial companies contribute a lot of information to information brokers to be distributed outside their firms. This information includes research reports, client statements, trade confirmations, responses to quotes, etc. The most actively moving and varied category is market data. Data in this category may include index valuations, indicative quotes, reference data for new securities, indications of interest, etc. Information changes at a variable pace per financial security and can move quickly.

In the age of information, financial institutions are concerned with entitlements controls, methods of consumption, cross-company content sharing, dangers of disclosure, etc. Over the course of the last decades, a small number of entrenched vendors have built data monopolies in specific asset classes and have limited incentives to innovate in the space. Because data is so sensitive, financial institutions are not willing to entrust others with the full range of their data.

These and other drawbacks exist.

SUMMARY OF THE INVENTION

According to one embodiment, the invention relates to a system that implements a multi-dealer market data distribution with distributed ledger technology. The system comprises: an input that receives information from a plurality of sources; a secure communications platform that facilitates communication with a plurality of member contributors and receivers; and a distributed ledger node that communicates with a network of distributed nodes where each node has a set of privacy controls and is further configured to perform the steps of: receiving, via the input, market data from a member contributor; aggregating the market data from the plurality of member contributors; applying a privacy control to each node that receives raw and aggregated market data; and providing each member syndication control of the market data contributed by each member contributor and preserving the set of privacy controls specific to each member contributor.

According to one embodiment, the invention relates to a method that implements a multi-dealer market data distribution with distributed ledger technology. A method comprises the steps of: providing, via a secure communications platform, a distributed ledger node that communicates with a network of distributed nodes where each node has a set of privacy controls, wherein the secure communications platform that facilitates communication with a plurality of member contributors and receivers; receiving, via the input, market data from a member contributor; aggregating the market data from the plurality of member contributors; applying a privacy control to each node that receives raw and aggregated market data; and providing each member syndication control of the market data contributed by each member contributor and preserving the set of privacy controls specific to each member contributor.

The system may include a specially programmed computer system comprising one or more computer processors, interactive interfaces, electronic storage devices, and networks. The computer implemented system, method and medium described herein provide unique advantages to entities, organizations and other users, according to various embodiments of the invention. The innovative system provides transparency to otherwise restricted pricing and other market data. Moreover, for many users, the invention seeks to reduce spend on market data. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a Market Data Hub using a distributed ledger platform, such as a Quorum implementation of Blockchain. Quorum represents an enterprise-ready distributed ledger and smart contract platform. Quorum may be implemented for applications requiring processing of private transactions within permissioned participants. While the various embodiments of the present invention are described within the context of Quorum and Blockchain, other distributed ledger platforms, including other implementations of Blockchain and technologies may be implemented.

Figure 1:
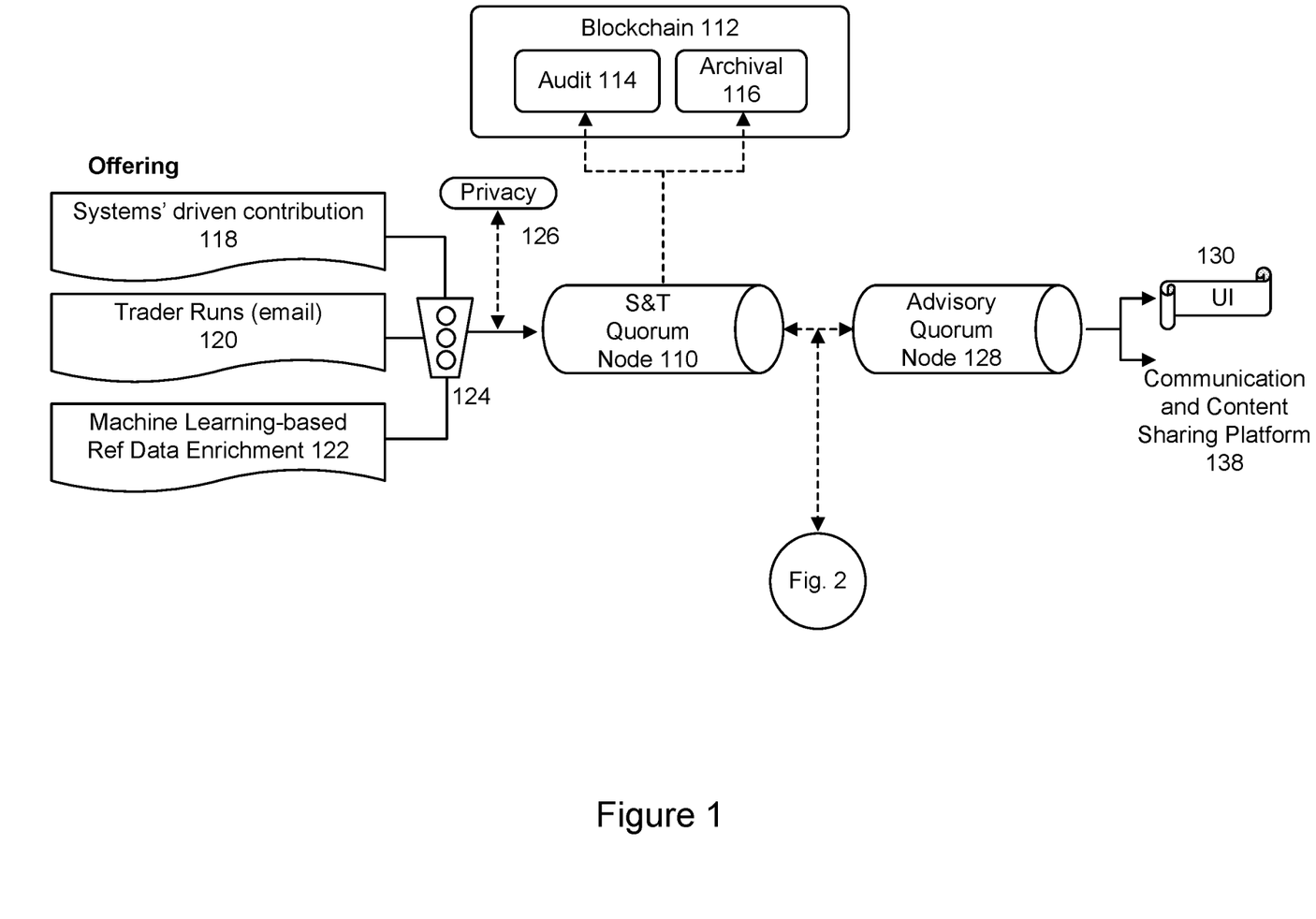
FIG. 1 is an exemplary system architecture, according to an embodiment of the present invention.

FIG. 1 is an exemplary system architecture, according to an embodiment of the present invention. FIG. 1 illustrates a combined feed of contributed prices from multiple participants. The system provides a shared data store with multiple interfaces including a high frequency API-driven channel, a low volume distributed framework-based contribution and query interface, email (and other communications) submission of bulk updates. The system also provides reference data enrichment through parsing of terms sheets, for example.

As shown in FIG. 1, Quorum Node 110 may implement Blockchain 112, which also provides Audit and Archival functions, at 114 and 116, respectively. Control and privacy may be provided at 124 and 126. For example, data may be received at 124 and privacy controls may be applied at 126. Inputs may include Systems' driven contribution 118, Trader Runs 120 and Machine Learning Reference Data Enrichment 122. Other sources of data may be applied. Quorum Node 110 may communicate with Advisory Quorum Node 128, which represents one or more nodes in the same Quorum network. Interaction with end users of such node 128 may be facilitated by a User Interface 130 as well as Communication and Content Sharing Platform represented by 138. In the example of FIG. 1, Quorum Node 110 may represent a Sales and Trading (S&T) node. User Interface 130 may be accessed by various users via a user device, e.g., mobile device, computer, server, processing component, etc.

The privacy features, represented by 126, enabled by the use of Quorum may create entitlements including coarse-grain entitlements which represent controls at a high functional level. Entitlements may also include business level decisions regarding access to the information, level of encryption as well as other features. An embodiment of the present invention may apply entitlements granularity at node level. This may involve multiple nodes per organization where multiple groups of control may be implemented. Other variations may be applied.

An embodiment of the present invention may enable fine grained entitlements to extend data privacy mode beyond ones at node level. An embodiment of the present invention may be extended to an entitlements model to more granular levels, as well as to broaden supported product range by removing limitations created by accumulation of large amount of historical data. For example, a customer may have different trading desks. An exemplary hedge fund may have an energy trading desk, a bond trading desk and a media trading desk. In this case, an entity may not want to show corporate bonds to the media desk because the media desk does business with other users and those users do not have the requisite entitlements. In this case, an entity would want to restrict privacy all the way down to the individual users. Other variations and restrictions may be applied.

With an embodiment of the present invention, active market participants may contribute pricing information and further make the data available to a wider community. An embodiment of the present invention recognizes that certain information, such as bond pricing is extremely sensitive and an entity would generally not trust a competing entity with any related data. For example, an entity may contribute pricing data to Node 110 and then view or otherwise access the contributed data. However, details to other pricing data contributed by other entities may be restricted and/or obscured. This may be implemented through fine-grained entitlements. For example, some data may be shared with a specific user but not with another user who performs competitor-type functions, even if they are members of the same customer group. Also, data relating to some products and data points may be shared but not others. An entity may have index products relevant to a particular trader and a particular customer where information sharing is authorized. However, others within the same customer group may not be allowed to view the data due to the sensitive nature of the trade. Other restrictions and permissions may be applied to address business goals and objectives.

The system may also provide an audit function, represented by 114 that audits information coming in and going out as well as the decisions made by Node 110. This information may be useful for investigations as well as potential regulatory requests. The system may also benchmark performance of various instruments and maintain other metrics and events. An embodiment of the present invention may further maintain robust audit logging of access to and aggregation of raw and aggregated market data.

An embodiment of the present invention provides an audit trail, represented by 114, and archival features, represented by 116, via secure Blockchain technology. An audit trail may be used to prove that the client was getting the best deal unimpeded by corporate allegiance. This may support assurances of a lack of a conflict of interest and/or other potential or perceived impairment. For example, a wealth management group may avoid doing business with an investment bank within the same entity (financial institution) due to the perception of a conflict of interest. However, an automatic audit trail may address this issue by providing support and assurances that a fair or best price was conveyed at the time of the trade.

According to an exemplary illustration, an entity, such as a financial institution, may have separate hubs for different financial products. The entity may host nodes for customers and integrate an interactive user interface to use data on Blockchain to create synthetic instruments, etc. In addition, an embodiment of the present invention may be used to link to trading systems for click-to-trade. Archival features 116 may provide historical records that may be based on archival rules directed to particular asset class and/or other factors. For example, data may be archived based on asset class (or other category) whether rollup or complete purge on a weekly basis is applied. This feature enables participants to generate historical records that may be referenced later.

As shown in FIG. 1, inputs may include Trader Runs 120 and Machine Learning Reference Data Enrichment 122. Trader Runs 120 may represent email communications, chat logs, voice to text data and/or other electronic communications. For example, email communications may be received and then automatically scrapped and/or analyzed for useful and relevant information. Machine Learning may listen to and observe events happening internally as well as externally. For example, Machine Learning may analyze data, such as bond prospective documents, and learn relevant data points to generate reference data.

Figure 2:
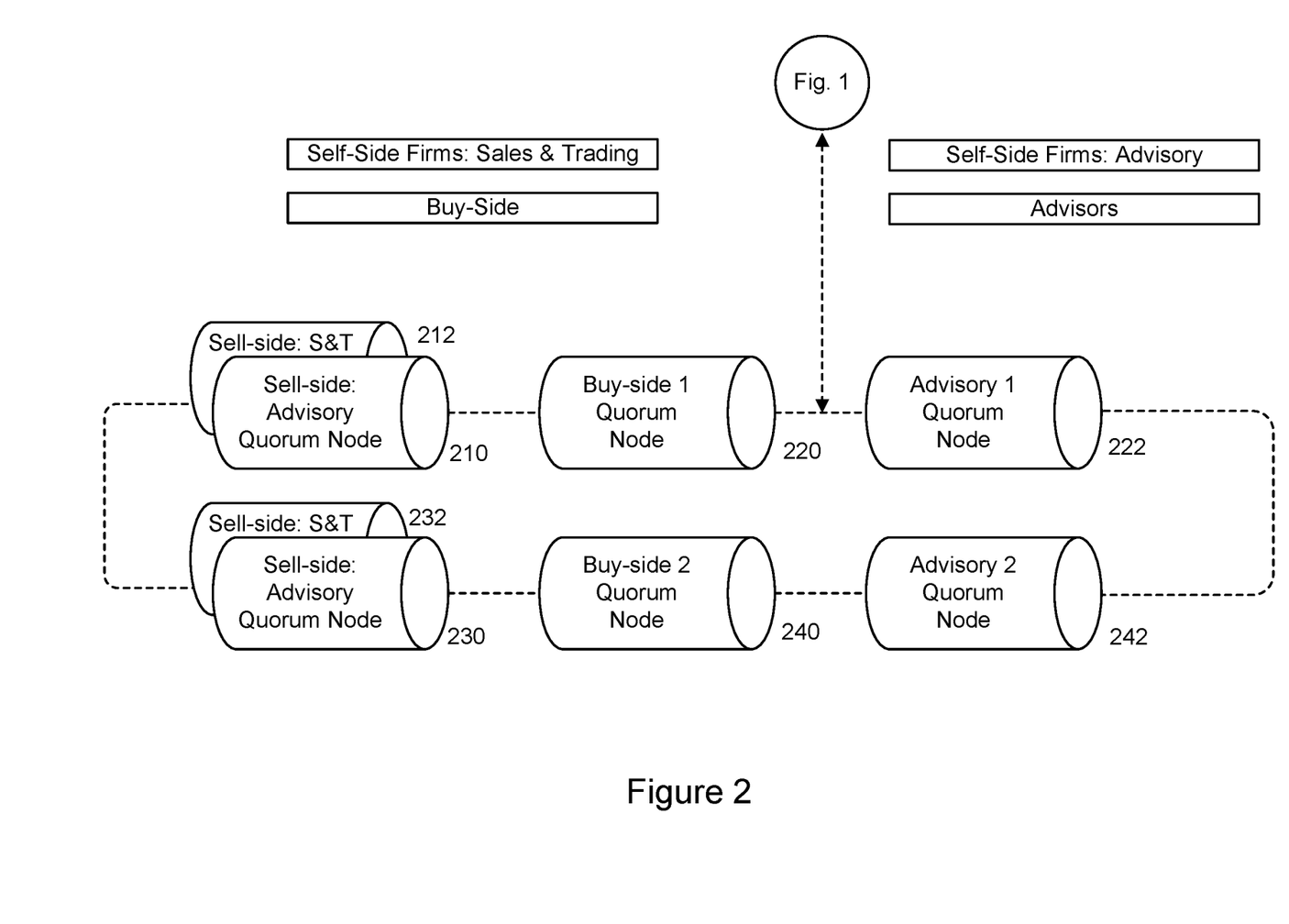
FIG. 2 illustrates an exemplary node network, according to an embodiment of the present invention.

FIG. 2 illustrates an exemplary node network, according to an embodiment of the present invention. As shown in FIG. 2, each sell-side firm may set up two Quorum nodes, one for Sales and Trading (S&T) and one for Advisory. For example, the network may include Advisory Node 210 and S&T Node 212 as well as Advisory Node 230 and S&T Node 232. Some sell-side firms may elect to set up additional Nodes to correspond to their departmental breakdowns. Buy Side and Advisory firms may have a single node each, which they can host themselves via Public Cloud, or use third party-provided quorum node as a service. This may be represented by Nodes 220 and 222 as well as Nodes 240 and 242. In this example, a sell-side firm may be associated with multiple nodes, each node having a different level of privacy and/or entitlements. For example, an entity may restrict access to contribution data from the S&T Node but not the Advisory Node. In addition, entitlements may be applied at a more granular level where restrictions and/or access may be applied to individual users and/or groups of users. Entitlements may be further defined based on access, action and/or other ability associated with management of contribution and other data.

As the illustration of FIG. 2, once this network is established, the need for a trusted third party may be eliminated through Blockchain's distributed ledger technology built into Quorum. An embodiment of the present invention is directed to integrating Blockchain technology and contributed data exchange, where immutability, data lineage, and non-repudiation are critical factors. With an embodiment of the present invention, a trust-less environment does not require a setup of a complex utility.

According to an embodiment of the present invention, the system may be implemented with low cost and administration. For example, Quorum nodes may run on in-house infrastructure or in cloud environments. In addition, clients may implement their own Quorum nodes, run on Public Clouds, and/or sell-side firms may chose to run nodes on a customers' behalf as a form of low-cost service. Quorum privacy may secure information at a granularity of the Quorum Node. Other architectures and implementations may be applied.

The system may be directed to providing enhanced data leak protection by controlling contribution for each data point from a Global Contributions Analytics Tool via a Consolidated Contributions Data Bridge. The Market Data Hub with Distributed Ledger Technology described herein may receive data from Consolidated Contributions Data Bridge, as described in patent application PCT/US19/27246, filed Apr. 12, 2019 and/or may be integrated with Global Contribution Analytics Tool, as described in patent application PCT/US19/40488, filed Jul. 3, 2019, the contents of which are incorporated by reference herein in their entirety. For example, Consolidated Contributions Data Bridge may send contributions data to various destinations, including Market Data Hub with Distributed Ledger Technology. Global Contribution Analytics Tool may analyze contributions data and further create visibility and analytics.

Figure 3:
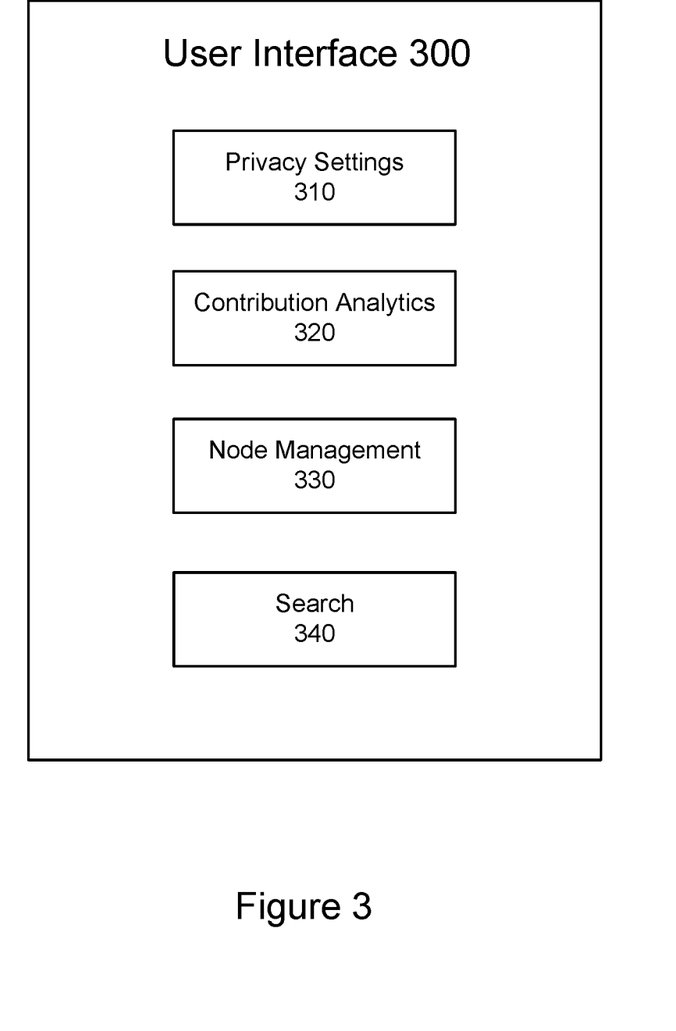
FIG. 3 is an exemplary user interface, according to an embodiment of the present invention.

FIG. 3 is an exemplary user interface, according to an embodiment of the present invention. User Interface 300 may provide functionality represented by Privacy Settings 310, Contribution Analytics 320, Node Management 330 and Search 340. Other functions and services may be provided.

Privacy Settings 310 enable a user to manage privacy settings of a particular contribution or group/class of contributions.

Contribution Analytics 320 enable a user to control the information that is sent out of the entity and also supports data analytics.

Node Management 330 enables a user to manage how nodes are distributed within an entity and across a network.

Search 340 enables a user to search using a company name. The system may then provide rate and maturity for the company. A user may search using other metrics and the system may provide various other formats of information. Search 340 may further enable a user to search in Ticker/ISIN, coupon and maturity format as well as other factors including spread data, venue, etc. In addition, performance criteria (e.g., bid price data, ask price data, bid spread, ask spread, etc.) may be provided. Other information may also be provided.

According to an exemplary implementation, functions represented by 310, 320 and 330 may be part of a common interface whereas functions represented by 340 may be provided via an end-user interface and may be separate from administrative functions. Other variations and implementations of the user interface may be realized.

An embodiment of the present invention is directed to increasing the availability, quality and optionality of market data services (e.g., content and technology) used by industry practitioners to exchange data in order to optimize the performance of markets and ultimately benefit clients in terms of transparency, choice and cost. An embodiment of the present invention may provide a platform that accepts prices from individual contributing parties. These prices may be combined into an anonymized consensus price or other synthetic securities after automated checks and then may be published at predetermined times. Suspect pricing may be flagged and queried, allowing contributors a chance to change erroneous pricing or withdraw based on rules and conditions. Results may be published through an access controlled interface, API or other communication mechanism. The platform may be used by various industry participants. An embodiment of the present invention may also apply to other classes of information and not be limited to market data. Examples of such data may include research reports, analyst rankings, reference data about securities, bid solicitations for municipal bonds, etc.

The features of the embodiments of the present invention provide benefits and advantages to the industry not fully available with current systems. An embodiment of the present invention seeks to mitigate the growing costs of market data (e.g., sourcing, processing, technology, etc.) borne by the industry and its customers, by encouraging the creation of contribution and consumption networks for data origination in a manner that promotes efficiency and competition, amongst industry participants. An embodiment of the present invention further enhances standardization amongst industry participants in relation to regulatory compliance through the creation of best-practice approaches and standards, and the utilization of data standards and appropriate data technology to drive down costs of compliance borne by the industry and customers. The innovative system advocates for regulation around transparent and fair pricing of content services in areas where some elements of current practice may discourage competition, reduce choice and drive switching costs higher for industry participants and customers. The system may further support data product technology that promotes the creation of broader and improved financial data products. This provides alternatives to choice-limiting bundled content/technology offers, and promotes the use of open APIs as a driver of improved market dynamics. The various features further ensure that members' data may be used to promote open and healthy competition in value-add data services to the industry.

An embodiment of the present invention may receive, store and/or aggregate information thereby providing participants a range of syndication controls of the information. Participants may have access to a high-speed API-driven method of controlling, contributing and accessing information. The innovative system may also support other ways to retrieve and/or contribute information by human and/or computer-based players via industry-standard tools, such as a secure cloud based communication and content sharing program as well as other secure communications platforms.

An embodiment of the present invention is directed to providing custom analytics, alerting, reporting, machine learning interfaces, etc., while preserving entitlements controls specific to participants. With custom analytics, participants may agree to, with or without seeing each other's contributed data, to process contributed information that matches specific parameters through a predefined function.

The output may become an independent instrument in the Market Data Hub with Distributed Ledger Technology, which may be governed by a set of commercial rules. Such rules may include free dissemination to the contributors and/or access to the information may be sold to customers. Another variation may calculate consensus pricing of a specific security by analyzing price contributions from multiple contributors, and provide it to a wide range of participants without identifying the specific contributors from whom the consensus price was received. Other variations may be implemented.

An embodiment of the present invention may support various types of alerts. For example, alerts may refer to customers defining a set of instruments to monitor and conditions that would trigger particular actions, such as pop-up notifications, emails, automated data or trading actions, etc. The system may automatically apply these rules to monitored instruments and deliver alerts to customers that requested them.

Reporting may be used by contributing parties as well as other users. Reporting may include statistics of what and how much data was contributed, who has viewed it, any fees due to be collected, etc. Other metrics may be reported and analyzed.

Machine learning interfaces may look at wide data swaths at a time and process data quickly. Such interfaces, when approved though entitlements, may enable machine learning algorithms to find new patterns in the information and/or correlation, and further generate alerts and/or custom analytics. Machine learning algorithms may learn from the information it sees over time rather than applying a deterministic formula to the current dataset. According to an exemplary illustration, the output may become an independent instrument in the Market Data Hub with Distributed Ledger Technology and may be governed by a set of rules, including commercial rules. The rules may include (free) dissemination to the contributors and/or access to the information may be sold to customers. Other variations may be implemented.

The system of an embodiment of the present invention may further support innovative technologies that may plug into existing members' processes, or be set up as new interfaces. For example, when a financial institution creates new bonds, an embodiment of the present invention may generate a complex terms sheet that defines conditions of the new bond. The complex terms sheet may then be communicated to a number of venues, where it may be analyzed to extract details relevant to their operations. Some entities may employ a site, where parsing (e.g., manual parsing, automatic parsing, etc.) may be performed. The Market Data Hub with Distributed Ledger Technology of an embodiment of the present invention may leverage Machine Learning systems to parse, filter and/or analyze documents initially communicated (e.g., via email, chat, portal, etc.) from various systems.

Non-incumbent data brokers presently lack data sets that are necessary to compete with various monopolistic incumbents, setting up a chain of events that reduce choice for both buy and sell side when picking technology and content platforms. Without the need to innovate, incumbents present barriers to the industry members when it comes to bringing in innovative technologies. Some players may even re-package data sent to it by an entity and then sell it back to the entity with limited or no value add. An embodiment of the present invention addresses many of the governance concerns while allowing new interfaces, methods, products, and communication solutions to come to the part of Finance industry that has seen limited change in the past decades.

An embodiment of the present invention provides an ability to innovate on the content within the restrictions imposed by the entitlement system only. Such content may span multiple participants of various sizes. A low-frequency interface for consumption and contributions via a secure communications platform may allow smaller and less technically sophisticated industry players to be full participants in the benefits of this offering. Content syndication embedded into the Market Data Hub with Distributed Ledger Technology may allow members to control how their information is disseminated to various content brokers while maintaining protection over proprietary data they give up when information leaves their firewalls. Another embodiment of the present invention enhances entitlements controls by utilizing standard technology, such as World Wide Web consortium's Open Digital Rights Language, known as ODRL. In this embodiment, individual data comes attached to or "wrapped" in a datagram that may contain explicit use conditions encoded in ODRL. Market Data Hub may automatically enforce these conditions on behalf of an originator of content, or pass them through to the parties receiving the content, based on instructions delivered via ODRL.

An embodiment of the present invention recognizes that there is a monetization opportunity by selling products on top of the base data that is contributed, which is not currently available.

An embodiment of the present invention is directed to maintaining a repository of market data from financial institutions and/or other sources of information. A user may submit a request to view/access currently known prices for a particular bond from a plurality of brokers. Another feature may involve creating a new data point for a particular bond that is also traded by other brokers. The system may then aggregate the information and generate an index of that data. The index may be generated in response to updated information.

An embodiment of the present invention may generate a data feed to providers with varying degrees of aggregated information. Information may be streamed to various participants without concern that the information is being distributed to unauthorized recipients. An embodiment of the present invention may generate and share a combined index that spans multiple broker dealers which does not impact any single dealer's ability to trade. Feed recipients may subscribe to any security known by the Market Data Hub with Distributed Ledger Technology and, if entitled, would receive a data feed of streaming updates. If entitled, information may also be requested from Market Data Hub with Distributed Ledger Technology on one-off basis, a process known as "snapping," or historical data may be accessed in bulk, or via a visualization, such as a chart or a table. Other access modes may be supported.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a multi-dealer market data distribution with distributed ledger technology, the system comprising:
   an input that receives information from a plurality of sources;
   a secure communications platform that facilitates communication with a plurality of new member contributors and receivers;
   a distributed ledger node that communicates with a network of distributed nodes where each node has a set of privacy controls, the network of distributed nodes including, per sell-side entity, at least a sales and trading node and an advisory node;
   a processor; and
   a memory including a set of instructions that, when executed by the processor, causes the processor to perform tasks, the tasks including:
      receiving, via the input, market data from the plurality of new member contributors, the market data including price data;

flagging suspect market data and allowing the plurality of new member contributors to change or withdraw erroneous pricing data based on rules and conditions;

aggregating the market data from the plurality of new member contributors, the aggregating including matching specific parameters of the market data through a predefined function to determine an anonymized consensus price;

applying the set of privacy controls to each node that receives raw market data and the aggregated market data;

providing syndication control of the market data via a first application programming interface (API) that controls dissemination of the market data,
wherein the market data is wrapped within a datagram that comprises explicit use conditions which are encoded in a rights expression language;

preserving the set of privacy controls specific to each node, including the sales and trading node and the advisory node of each sell-side entity;

providing the anonymized consensus price to each member contributor at predetermined times;

updating the aggregated market data;

in response to the updated aggregated market data, generating an index of the aggregated market data; and generating a data feed of varying degrees of the aggregated market data, wherein the set of privacy controls restricts access to the market data from the sales and trading node, and the set of privacy controls does not restrict access to the market data from the advisory node, wherein the set of privacy controls create entitlements, and wherein the set of privacy controls comprise a level of encryption, and wherein the distributed ledger node is a Quorum Node.

2. The system of claim 1, wherein the network of distributed nodes comprises a plurality of sell-side entities.

3. The system of claim 1, wherein the network of distributed nodes comprises a plurality of buy-side entities.

4. The system of claim 1, wherein the distributed ledger node comprises an audit function that generates an audit trail.

5. The system of claim 1, wherein the distributed ledger node comprises an archive function that archives data based on asset class.

6. The system of claim 1, wherein the distributed ledger node receives, via the input, trader runs communication data.

7. The system of claim 1, wherein the distributed ledger node receives, via the input, machine learning based reference data enrichment.

8. A method that implements a multi-dealer market data distribution with distributed ledger technology, the method comprising:
providing, via a secure communications platform, a distributed ledger node that communicates with a network of distributed nodes where each node has a set of privacy controls, the network of distributed nodes including, per sell-side entity, at least a sales and trading node and an advisory node, wherein the secure communications platform facilitates communication with a plurality of new member contributors and receivers;

receiving, via input, market data from the plurality of new member contributors, the market data including price data;

flagging suspect market data and allowing the plurality of new member contributors to change or withdraw erroneous pricing data based on rules and conditions;

aggregating the market data from the plurality of new member contributors, the aggregating including matching specific parameters of the market data through a predefined function to determine an anonymized consensus price;

applying the set of privacy controls to each node that receives raw market data and the aggregated market data;

providing syndication control of the market data via a first application programming interface (API) that controls dissemination of the market data,
wherein the market data is wrapped within a datagram that comprises explicit use conditions that are encoded in a rights expression language;

preserving the set of privacy controls specific to each node, including the sales and trading node and the advisory node of each sell-side entity;

providing the anonymized consensus price to each member contributor at predetermined times;

updating the aggregated market data;

in response to the updated aggregated market data, generating an index of the aggregated market data; and generating a data feed of varying degrees of the aggregated market data, wherein the set of privacy controls restricts access to the market data from the sales and trading node, and the set of privacy controls does not restrict access to the market data from the advisory node, wherein the set of privacy controls create entitlements, and wherein the set of privacy controls comprise a level of encryption, and wherein the distributed ledger node is a Quorum Node.

9. The method of claim 8, wherein the network of distributed nodes comprises a plurality of sell-side entities.

10. The method of claim 8, wherein the network of distributed nodes comprises a plurality of buy-side entities.

11. The method of claim 8, wherein the distributed ledger node comprises an audit function that generates an audit trail.

12. The method of claim 8, wherein the distributed ledger node comprises an archive function that archives data based on asset class.

13. The method of claim 8, further comprising:
receiving, via the input, trader runs communication data.

14. The method of claim 8, further comprising:
receiving, via the input, machine learning based reference data enrichment.

15. The system of claim 1, wherein when executed by the processor, the set of instructions causes the processor to perform further tasks, the further tasks including:
processing, by excluding market data that does not include a first set of predetermined parameters, the market data to produce a customized output that is governed by a set of dissemination rules.

16. The method of claim 8, further comprising:
processing, by excluding market data that does not include a first set of predetermined parameters, the market data to produce a customized output that is governed by a set of dissemination rules.

17. The system of claim 1, wherein when executed the set of instructions causes the processor to perform further tasks, the further tasks including:

providing an interactive user interface that utilizes the network of distributed nodes to create at least one instrument; and providing a click-to-trade feature that links to a trading system.

18. The method of claim 8, further comprising:

providing an interactive user interface that utilizes the network of distributed nodes to create at least one instrument; and providing a click-to-trade feature that links to a trading system.

\* \* \* \* \*